(12) United States Patent
Boyles et al.

(10) Patent No.: US 7,923,934 B2
(45) Date of Patent: Apr. 12, 2011

(54) BATTERY-POWERED FLUORESCENT LAMP

(75) Inventors: Samuel Boyles, Easley, SC (US); David Elsea, Anderson, SC (US)

(73) Assignee: Techtronic Power Tools Technology Limited (VG)

( * ) Notice: Subject to any disclaimer, the term of this patent is extended or adjusted under 35 U.S.C. 154(b) by 626 days.

(21) Appl. No.: 11/931,780

(22) Filed: Oct. 31, 2007

(65) Prior Publication Data
US 2009/0108758 A1 Apr. 30, 2009

(51) Int. Cl.
*H05B 41/00* (2006.01)

(52) U.S. Cl. .......................... 315/119; 315/224; 362/183

(58) Field of Classification Search .................. 362/262, 362/217.08, 614, 194, 195; 315/119, 129, 315/224, 86, 291, 307, DIG. 5, DIG. 7; 361/94, 361/93.9
See application file for complete search history.

(56) References Cited

U.S. PATENT DOCUMENTS

| | | | |
|---|---|---|---|
| 3,435,206 A | 3/1969 | Swanson | |
| 3,501,674 A | 3/1970 | Moore | |
| 3,671,803 A | 6/1972 | Hoxsie | |
| 3,758,823 A | 9/1973 | Jett | |
| 3,778,677 A | 12/1973 | Kriege | |
| 3,953,768 A | 4/1976 | Meredith | |
| 4,096,410 A | 6/1978 | Alley | |
| 4,150,323 A | 4/1979 | Yeh | |
| 5,191,262 A | 3/1993 | Nilseen | |
| 5,446,346 A | 8/1995 | Nilssen | |
| 5,449,979 A | 9/1995 | Ueoka | |
| 5,489,891 A * | 2/1996 | Diong et al. | 340/567 |
| 5,629,588 A * | 5/1997 | Oda et al. | 315/308 |
| 5,691,603 A | 11/1997 | Nilssen | |
| 5,734,229 A * | 3/1998 | Bavaro et al. | 315/86 |
| 5,757,140 A | 5/1998 | Nilseen | |
| 5,945,788 A * | 8/1999 | Li et al. | 315/308 |
| 5,969,483 A * | 10/1999 | Li et al. | 315/225 |
| 6,107,744 A | 8/2000 | Bavaro | |
| 6,252,357 B1 | 6/2001 | Tanaka | |
| 6,400,104 B1 | 6/2002 | Ham | |
| 6,459,213 B1 | 10/2002 | Nilssen | |
| 6,573,665 B2 | 6/2003 | Cooper | |
| 6,616,295 B2 | 9/2003 | Sako | |
| 6,891,336 B1 | 5/2005 | Mita | |
| 6,900,595 B2 | 5/2005 | Cojocary | |
| 7,064,494 B2 | 6/2006 | Miyazaki | |
| 7,109,665 B2 | 9/2006 | Green | |
| 7,246,927 B2 * | 7/2007 | Wikle et al. | 362/396 |
| 7,401,994 B2 * | 7/2008 | Kojima et al. | 403/326 |
| 7,429,118 B1 * | 9/2008 | Borowiak | 362/194 |
| 7,434,953 B2 * | 10/2008 | Newton et al. | 362/183 |
| 7,557,536 B2 * | 7/2009 | Lobert et al. | 320/114 |
| 2004/0218384 A1 | 11/2004 | Newton | |
| 2005/0258954 A1 * | 11/2005 | Ruskin | 362/802 |
| 2006/0087258 A1 | 4/2006 | Kubota | |

* cited by examiner

*Primary Examiner* — Jacob Y Choi
*Assistant Examiner* — Ephrem Alemu
(74) *Attorney, Agent, or Firm* — Michael Best & Friedrich LLP

(57) ABSTRACT

A lamp includes a light source, a power tool battery for providing a DC voltage level, and a base for housing the power tool battery. A stem is coupled to the base and supports the light source. A power inverter converts the DC voltage level to an AC voltage level, and a current sensing circuit operatively coupled to the converter or the inverter senses an over-current condition when the converter or the inverter draws more than a predetermined amount of current. The converter or inverter is disabled if the over-current condition continues for more than a predetermined amount of time so that the light source receives the AC voltage level and is illuminated for the predetermined amount of time before power is removed.

25 Claims, 6 Drawing Sheets

BATTERY-POWERED FLUORESCENT LAMP

BACKGROUND

This disclosure relates to lamps. In particular, this disclosure relates to a battery-powered fluorescent lamp.

Battery-powered lamps may be used when a source of AC power is unavailable or inaccessible. Battery-powered lamps may be convenient when a user is in an outside environment, such as while camping or when otherwise away from buildings or other structures having electricity. Such lamps may be powered by a plurality of standard 1.5 volt D-cell batteries, a 6 volt ganged battery pack, car battery, or other type of battery.

Some battery-powered lamps may use an incandescent light bulb, while others may use a fluorescent tube. When an incandescent light bulb is used, the batteries must be changed frequently, depending on usage duration, because incandescent light bulbs draw much more power than fluorescent bulbs, thus reducing battery lifetime. The user must have a sufficient supply of batteries on hand to meet lighting demands.

Some battery-powered lamps are able to interchangeably use an incandescent bulb or a fluorescent bulb. In such lamps, a user may inadvertently install an incandescent light bulb rather than a fluorescent bulb. Inadvertent installation of an incandescent light bulb in a battery-powered lamp designed to use a fluorescent bulb will result in significantly shorter battery life. This results in extra cost for frequent battery replacement. Further, the user may not realize that the shortened battery life is a result of installation of the wrong type of light bulb, and may become dissatisfied with the product.

SUMMARY

According to one specific embodiment, a lamp having a light source includes a power tool battery for providing a DC voltage level and a base for housing the power tool battery. A stem is coupled to the base and supports the light source. A power inverter converts the DC voltage level to an AC voltage level, and a current sensing circuit operatively coupled to the converter or the inverter senses an over-current condition when the converter or the inverter draws more than a predetermined amount of current. The converter or inverter is disabled if the over-current condition continues for more than a predetermined amount of time so that the light source receives the AC voltage level and is illuminated for the predetermined amount of time before power is removed.

In another specific embodiment, a battery-powered lamp having a light source includes a power tool battery that provides a first DC voltage level, a base for housing the power tool battery, and an electrical socket for receiving the light source. A hollow stem couples the base with the electrical socket, and provides electrical connection between the battery and the electrical socket. A voltage converter converts the first DC voltage level to a second DC voltage level, and a power inverter converts the second DC voltage level to an AC voltage level, where the AC voltage level is provided to the light source. A current sensing circuit operatively coupled to the converter or the inverter issues an over-current signal when the converter or the inverter draws more than a predetermined amount of current or power. A delay circuit receives the over-current signal and disables the converter or the inverter in response to the over-current signal. The delay circuit delays disabling the converter or the inverter for a predetermined amount of time so that the light source receives the AC voltage level and is illuminated for the predetermined amount of time before power is removed.

In a further specific embodiment, a lamp having a light source includes a power tool battery that provides a first DC voltage level, a base for housing the power tool battery, and a stem coupled to the base. The stem supports the light source. A voltage converter converts the first DC voltage level to a second DC voltage level, and a power inverter converts the second DC voltage level to an AC voltage level. A current sensing circuit operatively coupled to the converter or the inverter issues an over-current signal when the converter or the inverter draws more than a predetermined amount of current or power. A delay circuit disables the converter or the inverter after a predetermined amount of time after receiving the over-current signal so that the light source receives the AC voltage level and is illuminated for the predetermined amount of time before power is removed.

DETAILED DESCRIPTION OF EMBODIMENTS

Figure 1:
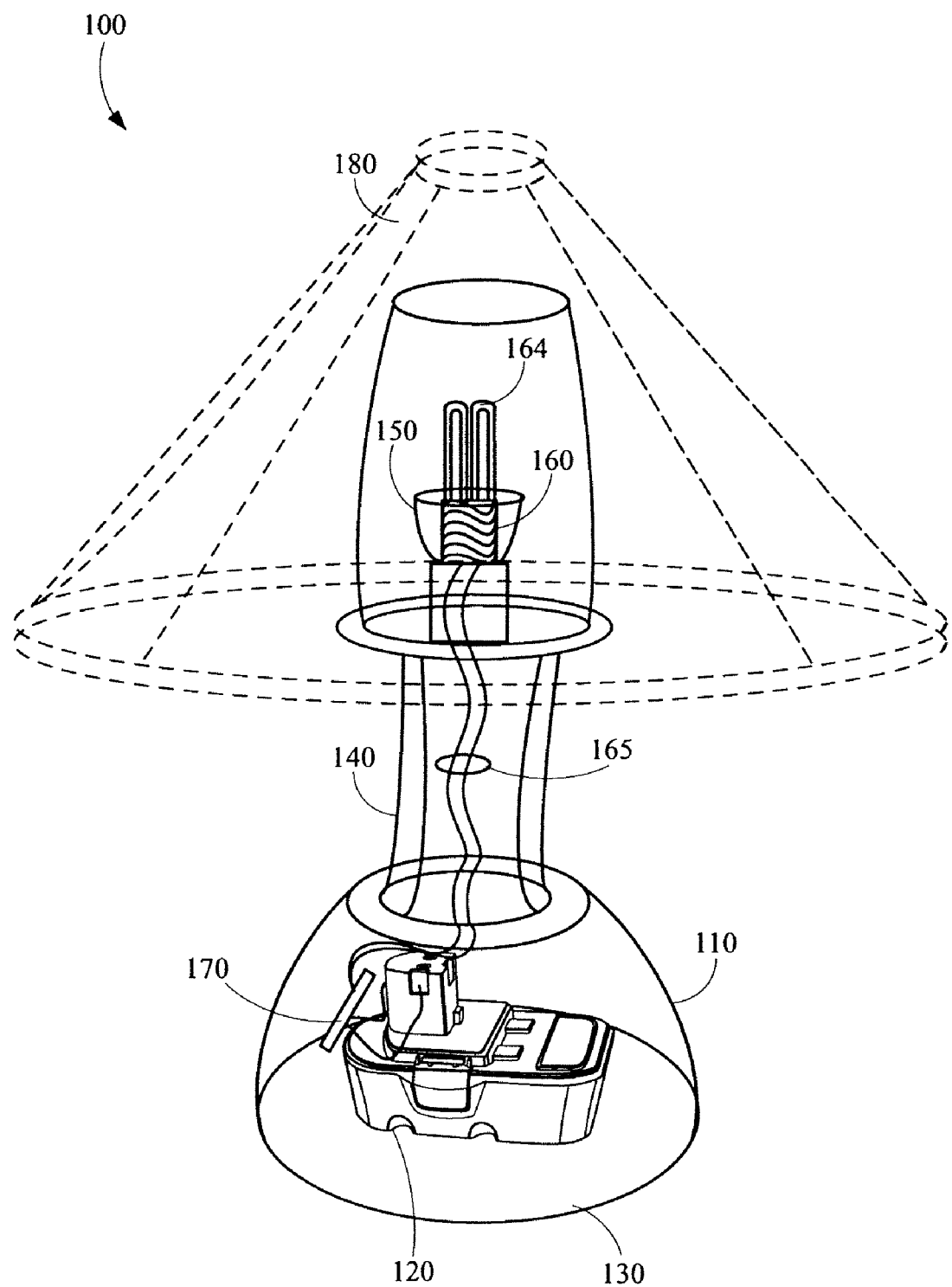
FIG. 1 is a perspective view of a specific embodiment of a battery-powered lamp.

The invention is described with reference to the drawings in which like elements are referred to by like numerals. The relationship and function of the various elements of this invention are better understood by the following description. Each aspect so defined may be combined with any other aspect or aspects unless clearly indicated to the contrary. The embodiments described below are by way of example only, and the invention is not limited to the embodiments illustrated in the drawings.

FIG. 1 shows the physical structure of a specific embodiment of a battery powered lamp 100. The lamp 100 may include a base 110 that may house a power tool battery 120. The base 110 may have a releasable bottom cover 130 configured to provide access to a battery compartment 134. A rigid elongated stem 140 may couple the base 110 to a bulb housing 150, which may contain an electrical socket 160. The electrical socket 160 may be a standard Edison-type screw-base socket, which accepts a standard compact fluorescent lamp (CFL) 164. A CFL is a commercially available self-contained fluorescent lamp configured to be received in a standard screw-type 120 volt AC socket, and is powered by a standard output of 110-125 volts AC. The elongated stem 140 may be hollow to facilitate the routing of electrical wiring 165 from a circuit board 170 to the electrical socket 160. The lamp 100 may include a decorative shade 180.

Unlike conventional lamps, which may use a plurality of D-cell batteries, the illustrated lamp or lantern 100 may include a power tool type battery 120. Power tool batteries may be used with a variety of power tools and may be rechargeable. Because many households have battery powered power tools, a user may be able to conveniently find an available power tool battery to install in the lamp 100, rather than attempting to locate a large number of D-cell or other types of batteries. Commercially available power tool batteries may be used, which may provide various output voltages, such as 19.2 volts, 18 volts, 14.4 volts, or 12 volts, and other voltage outputs. Such power tool batteries may be lithium-ion or nickel-cadmium batteries. Some suitable batteries may include the Ryobi® One+ Battery™, which may have a power output of about 1.7 ampere-hours.

Figure 2:
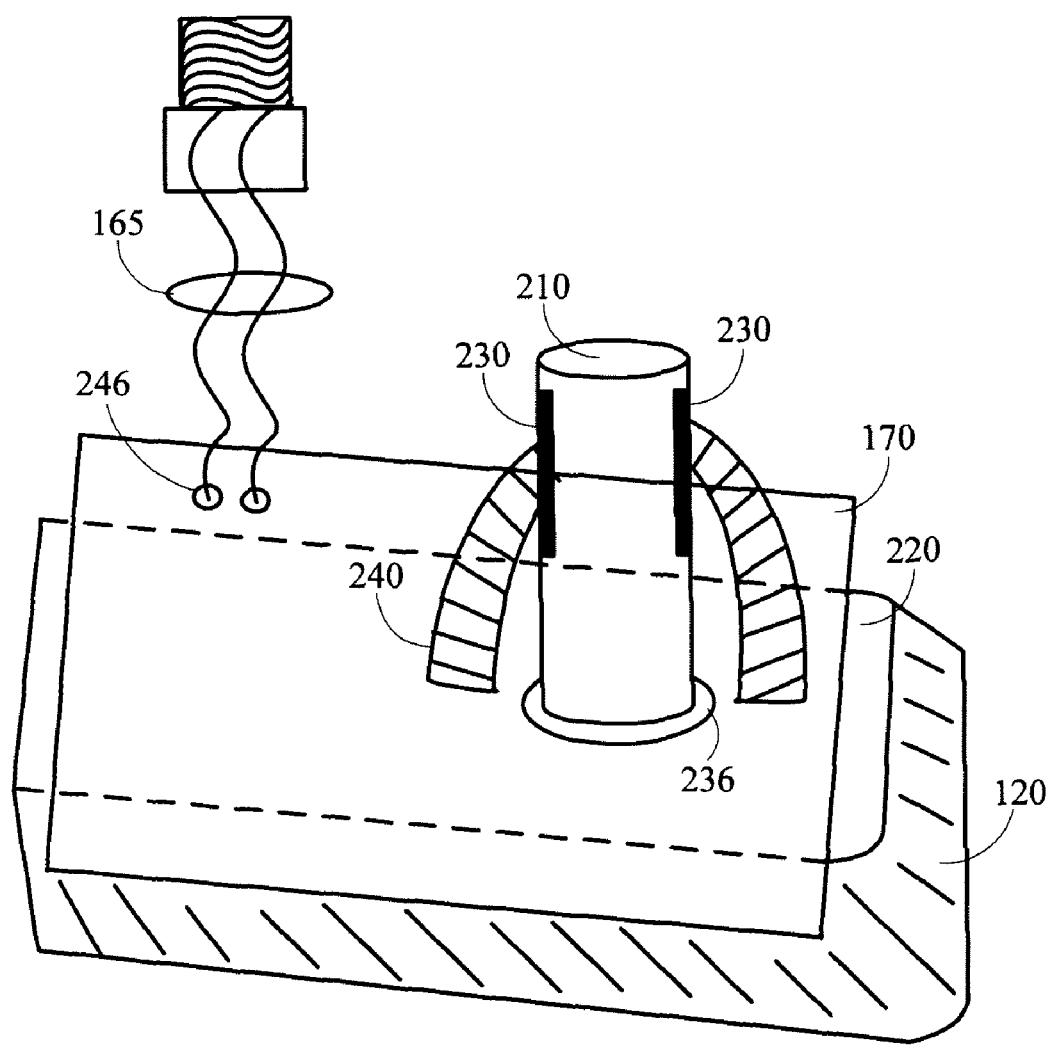
FIG. 2 is a perspective view of a specific embodiment of a battery and circuit board.

FIG. 2 shows a specific embodiment of the power tool battery 120 and the associated circuit board 170. The power tool battery 120 is generally rectangular in shape and may have a cylindrical stem or mast 210 projecting from a top surface 220 of the power tool battery. The battery 120 may be releasably connectable to the lamp 100 or the lamp base 110. The stem 210 may an electrical connection when inserted into a power tool. The stem 210 may include two or more metal contacts 230 for providing battery power to a load, such as the power tool or the CFL. The circuit board 170 may be disposed over the top surface 220 of the battery 120, and may have an aperture 236 configured to receive the mast 210. Wiring or mechanical contacts 240 may couple the circuit board 170 to the metal contacts 230 to provide battery power to the circuit board. The circuit board 170 may include output terminals 246 configured to deliver the electrical output of the circuit board to terminals of the electrical socket 160 via the wires 165 or other connectors. The circuit board 170 need not necessarily be mounted on the power tool battery 120, and may be mounted in any suitable location. For example, the circuit board 170 may be mounted to an interior portion of the base 110 using conventional fasteners or mounting hardware.

Figure 3:
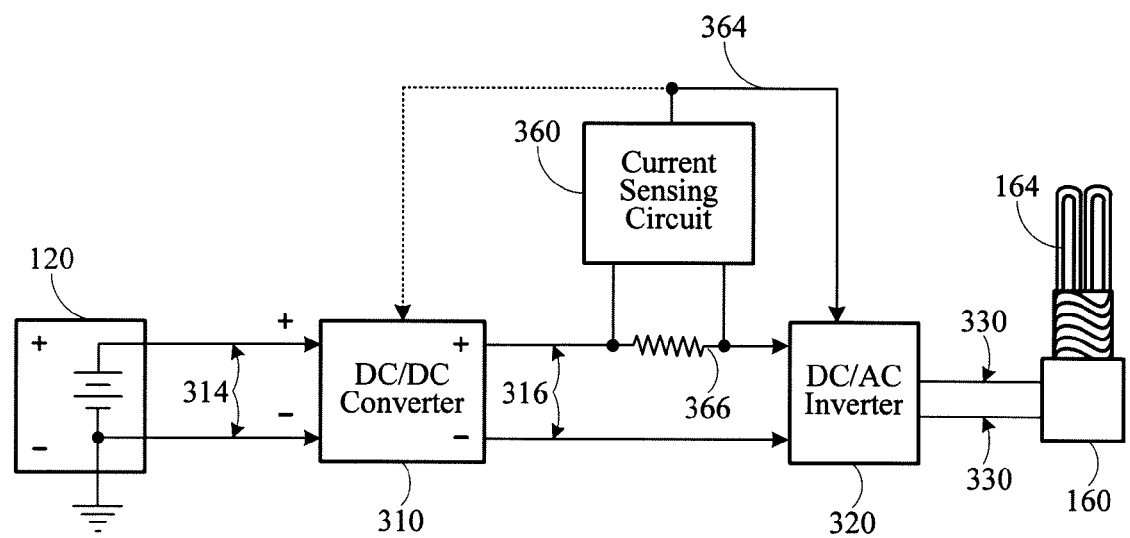
FIG. 3 is a schematic diagram of a lamp circuit having a DC-to-DC converter.

FIG. 3 is a schematic diagram of the electronic circuitry that may be mounted on the circuit board 170. The circuit board 170 may include a voltage converter 310 configured to convert a DC output voltage 314 of the battery to a lower DC voltage 316. For example, the voltage converter 310 may convert an 18 volt or 19.2 volt DC output voltage to a lower DC voltage level 316 of about between 12 volts to about 14.2 or about 15 volts. The voltage converter 310 may be a commercially available voltage converter, such as a step-down switching regulator no. LM25576 from National Semiconductor of California. Other suitable voltage converters or regulators may be used.

A power inverter 320 may convert the lower DC voltage level 316 to an AC voltage level 330. The output voltage 330 of the power inverter 320 may be an AC voltage of about 110 volts to about 130 volts. The power inverter 320 provides the AC voltage output 330 to the electrical socket 160, and thus provides power to the CFL 164. The power inverter 320 may be a commercially available power inverter, such as a DC-to-AC Mobile Inverter no. 0900-36 from PowerLine. Other suitable power inverters may be used.

A current sensing circuit 360 may be coupled between the voltage converter 310 and the power inverter 320. The current sensing circuit 360 may issue an over-current signal 364 when either the voltage converter 310 or the power inverter 320 draws more than a predetermined amount of current or power. For example, the maximum current draw may be limited to about 1.25 amperes at about 12 volts or about 0.8 amperes at about 19 volts. Such power ratings correspond to about a 15 watt power rating. A 15 watt CFL may provide about the same amount of light output as a corresponding 60 watt incandescent light bulb. The current sensing circuit 360 may issue the over-current signal 364 when a maximum power level or maximum current draw is reached. The over-current signal 364 is shown in dashed lines coupled to the voltage converter to indicate that either the voltage converter 310 or the power inverter 320 may receive the over-current signal.

A low value sensing resistor 366 may be coupled to the current sensing circuit 360, where a voltage developed across the sensing resistor may be proportional to the current flowing through the sensing resistor. In this way, the current sensing circuit 360 may determine the value of the current flow. The current sensing circuit 360 may be a commercially available current or power sensing device, such as a high-side current monitor no. ZXCT1010 available from Zetex Semiconductors. Other suitable current or power sensors and monitors may be used.

Figure 4:
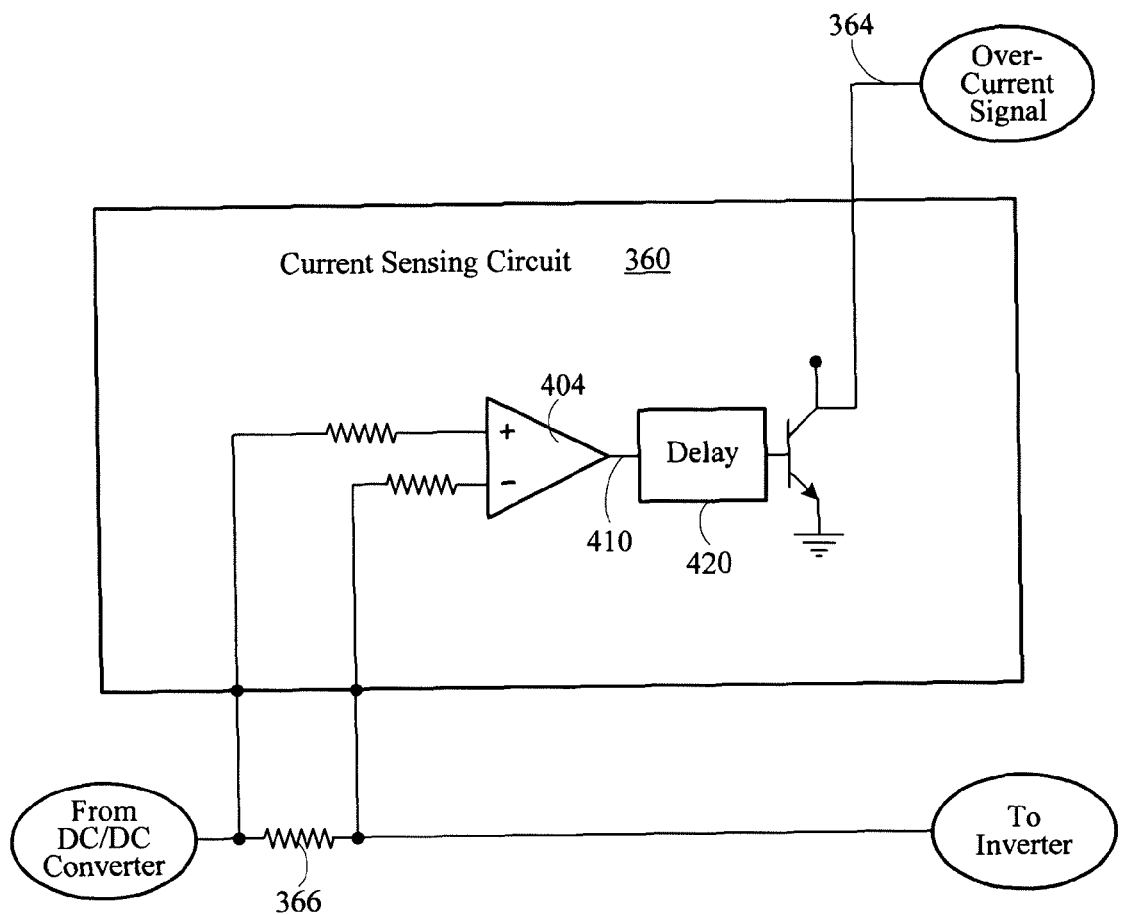
FIG. 4 is a schematic diagram of a current sensing circuit.

FIG. 4 shows a specific embodiment of the current sensing circuit 400. The current sensing circuit 400 may include an operational amplifier 404 having inputs coupled across the sensing resistor 366. The operational amplifier 404 may issue an output signal 410 when the maximum permissible current or power draw has been reached. A delay circuit 420 may delay the output signal 410 by a predetermined amount of time, for example by about 0.1 seconds to about 1 second. Other suitable delay times, for example, 1 second to 10 seconds, may be used depending upon the application. The delay circuit 420 may be a monostable vibrator or one-shot, such as a LM555 timer circuit. The output of the delay circuit 420 may drive the base of an output transistor 440, which in turn, may provide the over-current signal 364.

The battery-powered lamp 100 is configured to operate with a CFL rather than an incandescent light bulb. A CFL-type bulb draws much less power than a corresponding incandescent bulb having a similar light output rating. Accordingly, when a CFL is installed in the battery-powered lamp 100, the current sensing circuit 360 or 400 does not sense an over-current condition and thus does not issue the over-current signal 364. This conserves battery life and extends the operating time of the battery-powered lamp 100 before the battery requires recharging. However, because both an incandescent lamp and a CFL both fit into the electrical socket 160, a user may inadvertently install an incandescent light bulb in the battery-powered lamp 100. Because both types of light bulbs are powered by 120 volts AC, both bulbs could be illuminated using the 120 AC output of the power inverter 320. If the user inadvertently installs an incandescent bulb, the incandescent bulb will draw more current or power than may be permitted by the current sensing circuit 360 or 400. Accordingly, the current sensing circuit 360 or 400 will detect the over-current condition and will issue the over-current signal 364 to either the power inverter 320 or the voltage converter 310. This disables or turns off the power inverter 320 or the voltage converter 310, respectively.

The battery-powered lamp is self-restarting. This means that after the current sensing circuit 400 has disabled or turned off the voltage converter 310 or the power inverter 320 due to improper installation of an incandescent light, the CFL will be automatically illuminated upon installation.

Note that the power inverter 320 or the voltage converter 310 may be capable of providing the excessive current defining the over-current condition without physical damage, but is disabled or turned off to conserve battery life. However, the power inverter 320 or the voltage converter 310 is not disabled immediately upon detection of the over-current condition. Rather, the delay circuit 420 delays such disabling for a predetermined amount of time. The time delay before turning off the power inverter 320 or the voltage converter 310 permits illumination of an installed incandescent light bulb for an amount of time equal to the time delay, for example, about 0.1 seconds to about 1 second.

The brief illumination of the incandescent light bulb alerts the user that the wrong type of light bulb has been installed, but that the improper type of light bulb, as well as the lamp circuitry, is nonetheless functional. Without such a time delay, the light bulb would not be illuminated at all, or may only be illuminated for an extremely brief period of time not observable by the user. Thus, without the time delay, the user may believe that the replacement light bulb was burnt-out or that the battery-powered lamp 100 was not functioning. This conserves battery life while preventing inadvertent use of incandescent bulbs in the battery-powered lamp 100.

Other current sensing circuits or power monitoring circuits may be used. For example, a power monitoring circuit based on thermal conditions or temperature parameters may be used. If an excessive amount of current is drawn, a temperature-based monitor may disable or turn off the voltage converter 310 or the power inverter 320 when an elevated temperature is sensed. Because temperature elevation may require a predetermined amount of time to rise, a temperature-based power monitor may inherently include a time delay. Depending upon the sensitivity of the power monitoring circuit, different time delays may be implemented.

The current sensing circuits 360 and 400 or temperature-base power monitors may be separate from the voltage converter 310 or the power inverter 320, or may be incorporated into the voltage converter or the power inverter, respectively. The current sensing circuits 360 and 400 need not necessarily be placed between the voltage converter 310 and the power inverter 320. Alternatively, the current sensing circuits 360 and 400 may be placed between the battery 120 and the voltage converter 310. In another embodiment, a current sensing circuit adapted for AC monitoring may be placed between the power inverter 320 and the electrical socket 160.

Figure 5:
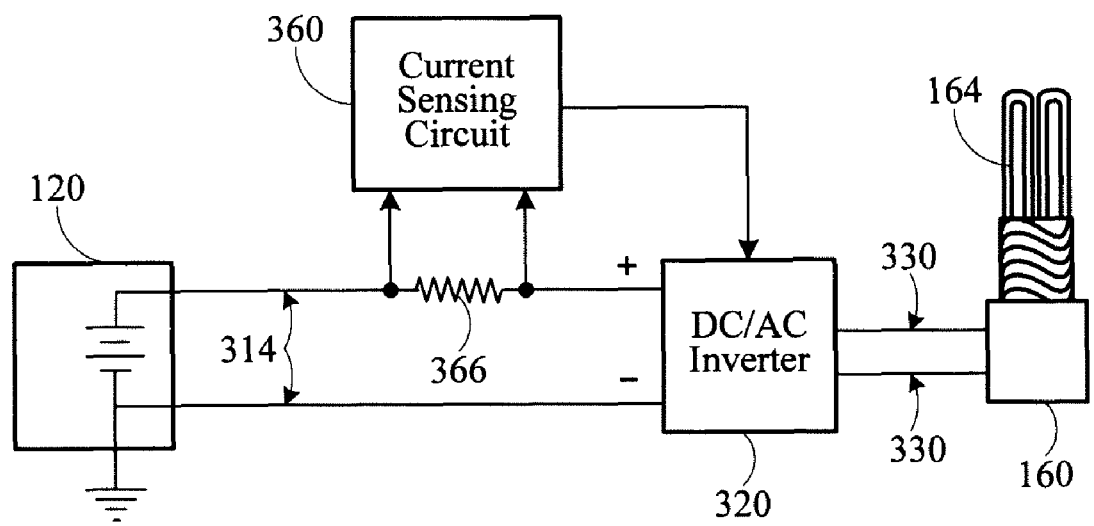
FIG. 5 is a schematic diagram of an alternate embodiment of a battery-powered lamp.

With regard to FIG. 3, the power inverter 320 may require an input voltage, for example, between about 10 volts to about 15 volts, which may be less than the battery voltage 314 of, for example, about 18 to 19 volts. Accordingly, the voltage converter 310 may convert or "step-down" the battery voltage 314 to a level suitable for input to the power inverter 320. However, if the battery 120 provides an output voltage 314 in the range suitable for input to the power inverter 320, the power converter 310 may be omitted, as shown in FIG. 5. In the alternate embodiment of the circuit of FIG. 5, the battery voltage 314 is provided to the power inverter 320 with no intermediate voltage conversion. The power inverter of FIG. 5 may accept an input voltage of about 12 volts to about 25 volts. The power inverter of FIG. 5, for example, is a commercially available power inverter.

Figure 6:
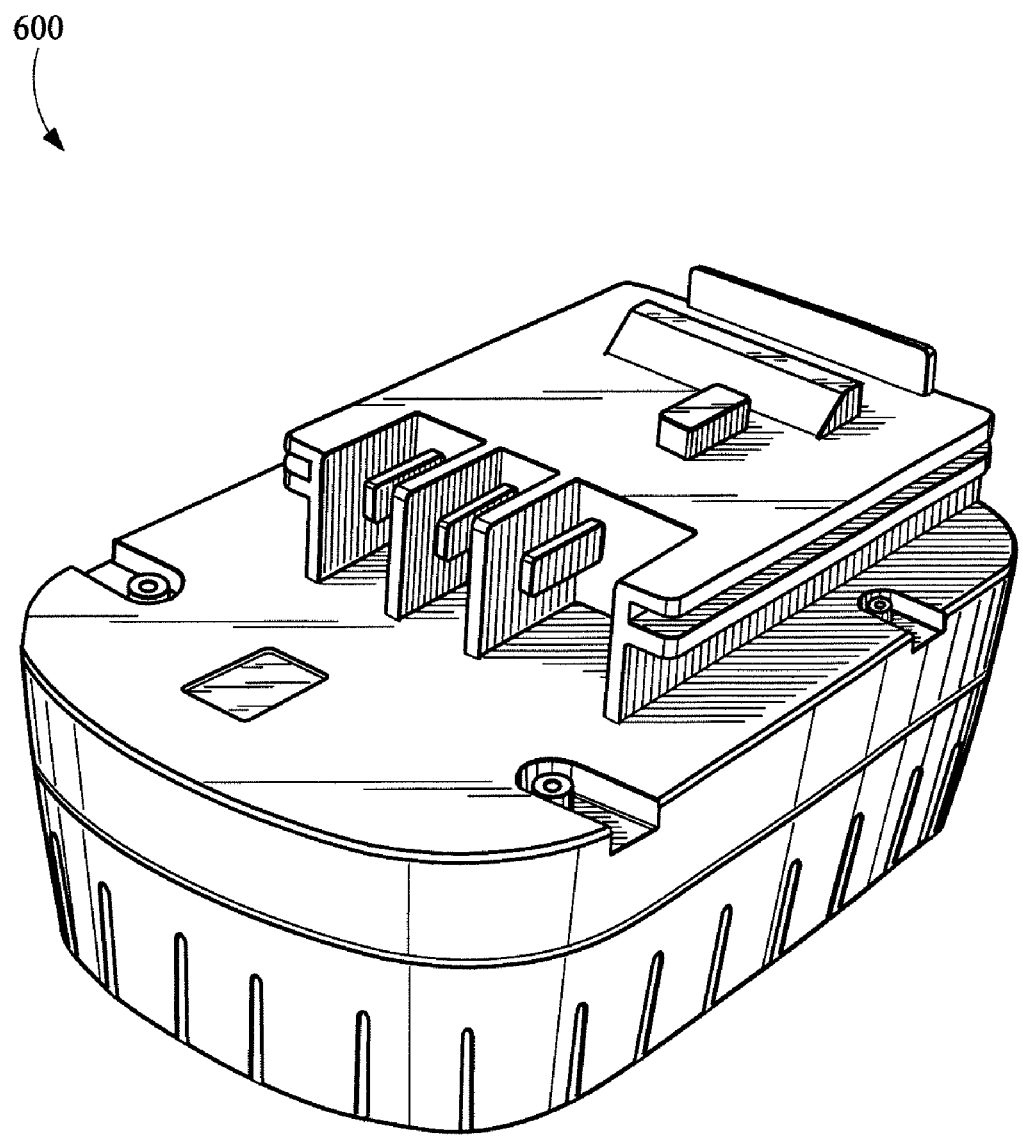
FIG. 6 is a slide-type power tool battery.

FIG. 6 shows a slide type power tool battery 600, which is known. Stem-type power tool batteries, slide-type power tool batteries, or other styles of power tool batteries may also be used in all of the described embodiments and circuitry. Electrical connection to the circuit board 170 can be made through contacts or wiring.

While the invention has been illustrated and described in detail in the drawings and foregoing description, the same is to be considered as illustrative and not restrictive in character, it being understood that only exemplary embodiments have been shown and described and do not limit the scope of the invention in any manner. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

We claim:

1. A lamp having a light source, comprising:
a base;
a power tool battery providing a DC voltage level, the battery releasably connected to the base;
a power inverter for converting the DC voltage level to an AC voltage level;
a current sensing circuit operatively coupled to a voltage converter and the power inverter; and
the current sensing circuit comprising a current sensing device configured to sense an over-current condition when the power inverter draws more than a predetermined amount of current; and
the current sensing circuit including a delay circuit positioned along an over-current signal path between the current sensing device and the power inverter,
wherein, in response to a sensed over-current condition,
the current sensing device outputs an indication of the over-current condition to the delay circuit along the over-current signal path, and
the delay circuit delays the indication of the over-current condition such that an over-current signal is output to the power inverter after a predetermined amount or time, and
wherein, via the delayed over-current signal, the power inverter is disabled or the DC voltage level is disconnected when the over-current condition continues for more than the predetermined amount of time so that the light source receives the AC voltage level and remains illuminated for the predetermined amount of time before power is removed.

2. The lamp according to claim 1, wherein the predetermined amount of time is between 0.1 seconds and 1.0 seconds.

3. The lamp according to claim 1, wherein the over-current condition occurs if the AC voltage level is supplied to an incandescent light bulb, the over-current condition causing the power inverter to be disabled after the predetermined amount of time has elapsed.

4. The lamp according to claim 3, wherein the incandescent light bulb receives the AC voltage during the over-current condition for the predetermined amount of time so as to alert a user as to installation of the incandescent light bulb.

5. The lamp according to claim 1, wherein the battery is a stem-type power tool battery or a slide-type power tool battery.

6. The lamp according to claim 1, further including a lamp stem coupled to the base to support the light source.

7. A lamp having a light source, comprising:
a base;
a power tool battery providing a first DC voltage level, the battery releasably connected to the base;
a voltage converter configured to convert the first DC voltage level to a second DC voltage level;
a power inverter for converting the second DC voltage level to an AC voltage level;
a current sensing circuit comprising a current sensing device operatively coupled to the voltage converter and the power inverter, and configured to issue an over-current signal when the voltage converter or the power inverter draws more than a predetermined amount of current or power; and
the current sensing circuit including a delay circuit positioned along an over-current signal path between the current sensing device and one of the voltage converter and the power inverter, wherein the delay circuit is configured to receive an indication of an over-current condition from the current sensing device to disable the voltage converter or the power inverter after a predetermined amount of time for the light source to receive the AC voltage level and remain illuminated for the predetermined amount of time before power is removed.

8. The lamp according to claim 7, wherein the predetermined amount of time is between 0.1 seconds and 1.0 seconds.

9. The lamp according to claim 7, wherein the over-current condition occurs when the AC voltage level is supplied to an incandescent light bulb, the over-current condition causing the voltage converter or the power inverter to be disabled after the predetermined amount of time has elapsed.

10. The lamp according to claim 9, wherein the incandescent light bulb receives the AC voltage during the over-current condition for the predetermined amount of time so as to alert a user of the over-current condition.

11. The lamp according to claim 9, wherein the incandescent light bulb is illuminated during the over-current condition.

12. The lamp according to claim 7, wherein when the light source is a compact fluorescent lamp, then an amount of current or power drawn is less than the predetermined amount of current or power.

13. The lamp according to claim 7, wherein the first DC voltage level is greater than the second DC voltage level.

14. The lamp according to claim 7, wherein the first DC voltage level is greater than 17 volts.

15. The lamp according to claim 7, wherein the second DC voltage level is between 11 volts and 15 volts.

16. The lamp according to claim 7, wherein the battery is a stem-type power tool battery or a slide-type power tool battery.

17. The lamp according to claim 7, further including a lamp stem coupled to the base to support the light source.

18. A battery-powered lamp having a light source, comprising:
a base;
a power tool battery providing a first DC voltage level, the battery releasably coupled to the base;
a stem coupled to the base and configured to support the light source;
a voltage converter configured to convert the first DC voltage level to a second DC voltage level;
a power inverter for converting the second DC voltage level to an AC voltage level, the AC voltage level provided to the light source;
a current sensing circuit operatively coupled to the voltage converter and the power inverter;
the current sensing circuit comprising a current sensing device configured to sense an over-current condition when the voltage converter or the power inverter draws more than a predetermined amount of current; and
the current sensing circuit including a delay circuit positioned along an over-current signal path between the current sensing device and the voltage converter or the power inverter;
wherein, in response to a sensed over-current condition,
the current sensing device outputs an indication of the over-current condition to the delay circuit along the over-current signal path, and
the delay circuit delays the indication of the over-current condition such that an over-current signal is output to the voltage converter or the power inverter after a predetermined amount of time, and
wherein, via the delayed over-current signal, the voltage converter or power inverter is disabled when the over-current condition continues for more than the predetermined amount of time so that the light source receives the AC voltage level and remains illuminated for the predetermined amount of time before power is removed.

19. The lamp according to claim 18, wherein the predetermined amount of time is between 0.1 seconds and 1.0 seconds.

20. The lamp according to claim 18, wherein the over-current condition occurs if the AC voltage level is supplied to an incandescent light bulb, the over-current condition causing the voltage converter or the power inverter to be disabled after the predetermined amount of time has elapsed.

21. The lamp according to claim 20, wherein the incandescent light bulb receives the AC voltage during the over-current condition for the predetermined amount of time so as to alert a user of the over-current condition.

22. The lamp according to claim 20, wherein the incandescent light bulb is illuminated during the over-current condition.

23. The lamp according to claim 18, wherein if the light source is a compact fluorescent lamp, an amount of current or power drawn is less than the predetermined amount of current or power.

24. A battery-powered lamp having a light source, comprising:
a power tool battery providing a first DC voltage level;
a base for housing the power tool battery;
an electrical socket for receiving the light source;
a hollow stem configured to couple the base with the electrical socket and provide an electrical connection between the battery and the electrical socket;
a voltage converter configured to convert the first DC voltage level to a second DC voltage level;
a power inverter for converting the second DC voltage level to an AC voltage level, the AC voltage level provided to the light source;
a current sensing circuit operatively coupled to the voltage converter and the power inverter;
the current sensing circuit comprising a current sensing device configured to issue an over-current signal when the voltage converter or the power inverter draws more than a predetermined amount of current or power;
the current sensing circuit including a delay circuit positioned along an over-current signal path between the current sensing device and one of the voltage converter and the power inverter, wherein the delay circuit is configured to receive an indication of an over-current condition from the current sensing device and disable the voltage converter or the power inverter in response thereto; and
wherein the delay circuit outputs the over-current signal after a predetermined amount of time to disable; and the voltage converter or the power inverter for the light source to receive the AC voltage level and remain illuminated for the predetermined amount of time before power is removed.

25. The lamp according to claim 1, wherein the DC voltage level is greater than 17 volts.

* * * * *